(12) United States Patent
Metge et al.

(10) Patent No.: US 6,640,860 B1
(45) Date of Patent: Nov. 4, 2003

(54) VEHICLE PNEUMATIC TIRE WITH SPECIFIED CARCASS LENGTH AND/OR CURVATURE

(75) Inventors: Axel Metge, Hannover (DE); Burkhard Wies, Hannover (DE); Mario Walczok, Wedemark (DE); Johannes Josef Baumhöfer, Wedemark (DE)

(73) Assignee: Continental Aktiengesellschaft, Hannover (DE)

( * ) Notice: Subject to any disclaimer, the term of this patent is extended or adjusted under 35 U.S.C. 154(b) by 154 days.

(21) Appl. No.: 09/612,191

(22) Filed: Jul. 7, 2000

(30) Foreign Application Priority Data

Jul. 9, 1999 (DE) .......................... 199 32 027

(51) Int. Cl.$^7$ .............................. B60C 3/00; B60C 9/02
(52) U.S. Cl. ...................... 152/454; 156/110.1; 156/123
(58) Field of Search ...................... 152/454; 156/110.1, 156/123

(56) References Cited

U.S. PATENT DOCUMENTS 4,962,804 A * 10/1990 Ueda et al. .................. 152/454

FOREIGN PATENT DOCUMENTS

| DE | 3411909 | 10/1984 |
|----|---------|---------|
| DE | 3626123 | 2/1988 |
| DE | 4018117 | 1/1991 |
| EP | 0269301 | 6/1988 |
| EP | 0323519 | 7/1989 |
| GB | 2024738 | 1/1980 |
| GB | 1576409 | 10/1980 |

\* cited by examiner

*Primary Examiner*—Adrienne C. Johnstone
(74) *Attorney, Agent, or Firm*—Greenblum & Bernstein, P.L.C.

(57) ABSTRACT

A vehicle pneumatic tire and a process of forming a vehicle pneumatic tire are disclosed, wherein the tire includes a patterned tread, a belt brace including at least one layer, bead areas having bead cores, and a carcass having at least one layer, which is arranged through the sidewalls, around the bead cores, and back into the sidewalls as turn-ups. The carcass, in a region between the belt binding point and the bead binding point, is formed with a length shorter than that of a theoretical carcass between the belt binding point and the bead binding points determined in accordance with an equilibrium figure. This abstract is neither intended to define the invention disclosed in this specification nor intended to limit the scope of the invention in any way.

10 Claims, 3 Drawing Sheets

VEHICLE PNEUMATIC TIRE WITH SPECIFIED CARCASS LENGTH AND/OR CURVATURE

BACKGROUND OF THE INVENTION

1. Field of the Invention

The present invention relates to a vehicle pneumatic tire having a patterned tread, a belt brace having, e.g., multiple layers, bead areas having bead cores, and a single- or multi-layer constructed carcass having at least essentially radially running strength supports. The carcass is designed to run around the bead cores and to run back into the sidewalls as a turn-up. Further, in the unloaded and unpressurized condition of the tire, as well as when the tire is mounted on a rim, the positioning of the profile of the carcass deviates from that of an equilibrium figure.

2. Discussion of Background Information

A tire similar in general to that discussed above is known, e.g., from GB-A 2 024 738. To avoid undesired deformations and stresses on belt edges, it is suggested to design the belt layers in a specific manner for the purpose of influencing the carcass profile in the unpressurized or nearly unpressurized condition as compared to the carcass profile under internal pressure.

British Patent 1 576 409 relates to increasing the load-carrying capacity of a vehicle pneumatic tire without having to accept losses in comfort or undesired heating of the tire. For this purpose, it suggests designing the sidewalls or the carcass with a comparably slight curvature and preventing it from returning under internal pressure to a more bulbous shape. For this purpose, the belt brace is designed by providing special belt layers to be very resistant against bending moments in the circumferential direction.

It is common and has also been state of the art for a long time to determine or calculate the contour of the carcass in the tire, which also usually at least approximately corresponds to the sidewall contour, at a given internal pressure as a function of the carcass length in the sidewalls. When so doing, the heating mold for the tire is also designed in such a way that, if possible, it does not cause any changes in the contour of the carcass or the contour of the tire sidewalls, starting from the contour determined by the heating mold up to the contour that the tire assumes in mounted condition under internal pressure. For such a design, it is known that the carcass is positioned according to its neutral. This is intended to avoid unnecessary stresses in the tire due to changes in shape. In the tread area, tires also usually have a contour curved in the crosswise direction, so that when deflecting under internal pressure and load, the contact pressures acting within the driving surface, the area of the tire touching the ground, are compensated to the extent possible, which is necessary for force transmission and to constitute the desired load-carrying capacity. This curvature, like the curvature of the carcass in the sidewall areas, is predetermined by the tire shape but, in the finished product, it is also a function of the design of the strength-giving elements, e.g., strength supports in the belt and in the carcass.

When the carcass contour is positioned in a neutral manner, a carcass profile often results in the flattened condition in which the forces caused by the internal pressure are transferred relatively strongly to the shoulder areas of the ground contact surfaces. Therefore, the contact pressure distribution within the driving surface is no longer compensated to the desired extent, which can impair a series of tire properties, e.g., abrasion, noise level, and driving and braking behavior on wet and dry surfaces.

A number of ideas for which patent applications have been filed or that are protected by patents deal with the optimum design for the outside contour of vehicle pneumatic tires, e.g., EP-A1 0 269 301, and with measures by which the pressure of the tire in the ground contact surface and/or the contour of the ground contact surface itself are to be influenced, e.g., to reduce rolling resistance or to achieve more even abrasion. In that regard, reference is made, e.g., to EP-B1 0 323 519. The known measures usually involve a design for curvature of the tire in the tread area.

SUMMARY OF THE INVENTION

The present invention provides the desired compensated contact pressure ratios within the part of the tire touching the ground, the driving surface, by measures involving the positioning of the carcass. As a result, a positive influence can be had on braking behavior on wet and dry surfaces, noise level, and abrasion behavior.

Accordingly, the carcass, in an area between a binding point to the belt and a binding point to the rim, is formed with a length that is shorter than the theoretical length of the carcass between those points, which results from the equilibrium figure.

The measures according to the invention have a pronounced beneficial effect on the desired compensated pressure ratios in the ground contact surface of the tire. The shorter carcass areas in the shoulder areas the extent of the transfer of forces exerted by the tire internal pressure and thereby produces uniformity of the pressure ratios in the contact surface. Under internal pressure, the tire sidewalls are in fact deformed in such a way that the tire becomes wider in comparison with its unpressurized condition and, in a zenith area, grows somewhat and thereby acts against growth in the belt edge areas and, in particular, even a reduction of the distance from the belt edges to the bead occurs.

In particular, the design is such that the length of the carcass between the two connection points corresponds to about 80 to 97%, in particular about 85 to 95%, of the theoretical length in those areas determined in accordance with the equilibrium figure. It is precisely within those areas that the most compensated possible pressure distribution in the ground contact surface of the tire can be achieved.

In that regard, it is also advantageous when, in the unpressurized and unloaded condition of the tire while it is mounted on a rim, the mean radius of the carcass is greater than the mean radius of a carcass positioned according to the equilibrium figure. This corresponds to a "straighter" positioning of the carcass profile.

Tires designed according to the invention are preferably simultaneously designed in such a way that the alternating tensile and compression stresses in the turn-ups of the carcass, which are detrimental for various tire properties, can be avoided. For this purpose, in the unpressurized, unloaded condition of the tire while it is mounted on a rim, the carcass in the area between the binding point to the belt and the point having the largest cross-sectional width has one radius or multiple radii which together are smaller than the radius or radii in those areas of the carcass that run between the point having the largest cross-sectional width and the binding point to the rim.

Therefore, when the tire rolls under load, only fluctuating tensile stresses act in the turn-ups of the carcass, for whose size and distribution over the turn-up of the carcass it is beneficial if, in the unpressurized, unloaded, and mounted condition of the tire, the ratio of the smallest radius of the carcass to the largest radius of the carcass is between about 1:1.1 and 1:2.2, in particular between about 1:1.4 and 1:2.0.

For optimum distribution of the fluctuating compression stresses in the area of the carcass turn-up, it is advantageous in this regard if, in the unpressurized, unloaded, and mounted condition of the tire, the radius of the carcass is smallest in the area of the binding point to the belt and largest in the area of the binding point to the rim, such that the radius of the carcass continuously enlarges between those two points.

The present invention is directed to a vehicle pneumatic tire that includes a patterned tread, a belt brace including at least one layer, bead areas having bead cores, and a carcass having at least one layer, which is arranged through the sidewalls, around the bead cores, and back into the sidewalls as turn-ups. The carcass and the belt brace are coupled together at a belt binding point, and a radially outmost portion of the bead area is adapted to contact a rim forming a bead binding point between the carcass and the bead area. The carcass, in a region between the belt binding point and the bead binding point, is formed with a length shorter than that of a theoretical carcass between the belt binding point and the bead binding points determined in accordance with an equilibrium figure.

In accordance with a feature of the invention, the length of the carcass and the theoretical length of the carcass are determined for a tire in an unpressurized condition and when the tire is on the rim.

According to another feature of the present invention, the carcass may include at least essentially radially running strength supports.

In accordance with still another feature of the instant invention, the length of the carcass between the binding points may be about 80 to 97% of the length of the theoretical carcass between the binding points. Preferably, the length of the carcass between the binding points may be about 85 to 95% of the length of the theoretical carcass between the binding points.

According to another feature of the invention, in an unpressurized, unloaded, and mounted condition of the tire, a mean radius of the carcass can be greater than that of the theoretical carcass.

In an unpressurized, unloaded condition of the tire while it is mounted on a rim, the carcass, in an area between the belt binding point and a largest cross-sectional width point, can have a radius of curvature which is smaller than a radius of curvature of the carcass between the largest cross-sectional width point and the bead binding point. Further, in the unpressurized, unloaded, and mounted condition of the tire, a ratio of the radii of curvature, from smallest radius to largest radius, may be between about 1:1.1 and 1:2.2, and preferably, the ratio of the radii of curvature may be between about 1:1.4 and 1:2.0. Still further, in the unpressurized, unloaded, and mounted condition of the tire, the radius of curvature of the carcass can be smallest in a region of the belt binding point and largest in a region of the bead binding point, and the radius of curvature between the belt binding point region and bead binding point region may continuously increase.

In accordance with another feature of the present invention, the belt can include a plurality of layers.

The present invention is directed to a process for forming a vehicle pneumatic tire that includes a patterned tread, a belt brace including at least one layer, bead areas having bead cores, and a carcass, having at least one layer. The process includes arranging the carcass through the sidewalls, around the bead cores, and back into the sidewalls as turn-ups, such that a portion of the carcass extends at least from a belt binding point, at which the carcass is coupled to the belt, to a bead binding point, which is a radially outmost portion of the bead area that is adapted to contact a rim. The process also includes forming the portion of the carcass with a length which is shorter than that of a theoretical carcass between the belt binding point and the bead binding point determined in accordance with an equilibrium figure.

In accordance with a feature of the invention, in an unpressurized, unloaded condition of the tire while it is mounted on a rim, the process may further include forming the carcass, in an area between the belt binding point and a largest cross-sectional width point, with a radius of curvature which is smaller than a radius of curvature of carcass between the largest cross-sectional width point and the bead binding point. In the unpressurized, unloaded, and mounted condition of the tire, a ratio of the radii of curvature, from smallest radius to largest radius, may be between about 1:1.1 and 1:2.2, and preferably the ratio of the radii of curvature can be between about 1:1.4 and 1:2.0. Still further, in the unpressurized, unloaded, and mounted condition of the tire, the process can further include forming the carcass such that its radius of curvature is smallest in a region of the belt binding point and is largest in a region of the bead binding point, wherein the radius of curvature between the belt binding point region and bead binding point region continuously increases.

The present invention is directed to a vehicle pneumatic tire that includes a patterned tread, a belt brace including at least one layer, bead areas having bead cores, and a carcass having at least one layer, which is arranged through the sidewalls, around the bead cores, and back into the sidewalls as turn-ups. The carcass and the belt brace are coupled together at a belt binding point, and a radially outmost portion of the bead area is adapted to contact a rim forming a bead binding point between the carcass and the bead area. The carcass, in a region between the belt binding point and the bead binding point, is formed with a profile different than that of a theoretical carcass between the belt binding point and the bead binding points determined in accordance with an equilibrium figure.

According to a feature of the invention, the profile of the carcass between the binding points can be flatter than that of the theoretical carcass between the binding points.

In accordance with yet another feature of the present invention, a length of the carcass between the binding points may be shorter than that of the theoretical carcass between the binding points.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
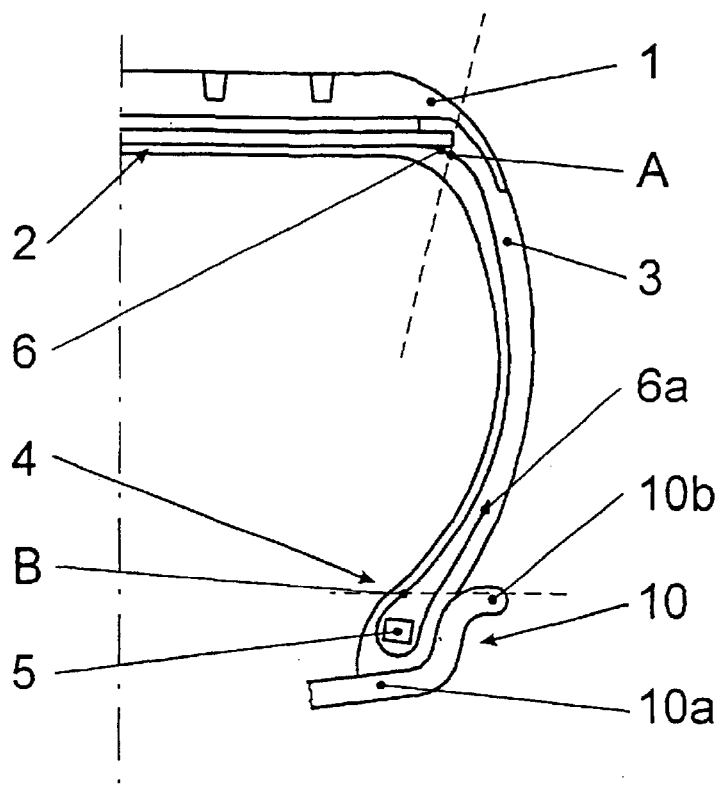
FIG. 1 schematically illustrates a cross-section of a vehicle pneumatic tire in an unpressurized and unloaded condition.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The vehicle pneumatic tires shown in cross section in FIGS. 1–4 are radial tires intended for passenger vehicles. However, the invention is not limited to that type of tire and is also feasible for commercial vehicle tires.

The illustrated tire in FIGS. 1–4 is disposed on a rim 10, of which only bead seat 10a and rim flange 10b are shown. Moreover, the tire includes a patterned tread 1, belt brace 2, sidewalls 3, bead areas 4 with bead cores 5, and radial carcass 6. Belt brace 2 can be formed in a conventional manner and, therefore, will generally include, e.g., multiple belt layers having a crossing arrangement of strength supports and, optionally, a belt binding as a radial outermost layer having strength supports running in a circumferential direction of the tire. Moreover, in the illustrated embodiments, carcass 6 can be formed with one layer and can include strength supports, e.g., made of a textile material, embedded in a natural rubber or synthetic rubber matrix which run at least essentially in a radial direction. Therefore, carcass 6 can be formed in the conventional manner and obviously can also include more than one layer. In bead areas 5, carcass 6 is guided around bead cores 5 from an inside toward an outside and then returned back into the sidewall areas. The two returned areas of carcass 6 each form carcass turn-up 6a.

According to the present invention, the length of those areas of carcass 6 which run in the sidewalls is specially designed or chosen. According to the prior art, it is common to position the contour of the carcass in the tire sidewalls in such a way that it follows its neutral and therefore is positioned according to the equilibrium formula. With such a positioning of the carcass or tire sidewall contour, the heating mold for the tires in the area of the sidewall shells is designed with regard to its form or contour such that, if possible, no change in the carcass contour in the sidewalls, and therefore the tire sidewall contour starting from the contour in the heating form up to the contour of the tire, occurs under internal pressure. This is intended to avoid unnecessary stresses in the tire that could occur due to changes in the tire shape.

Carcass 6, in accordance with the features of the instant invention, is formed to be shorter in sidewalls 3 than its corresponding length would be when determined in accordance with the neutral positioning according to the equilibrium formula or equilibrium figure. Further, beginning with the heating mold of the tire, carcass 6 according to the instant invention is also provided with a much straighter profile, which is illustrated in FIG. 1, where the unpressurized condition of the tire is shown. The length of carcass 6, which is shorter in comparison with a carcass determined according to the equilibrium figure, is adjusted between point A and point B. In this regard, point A practically represents the binding point of carcass 6 to belt 2. As shown in the illustrated tire cross-section, point A is determined as an intersection of carcass 6 and a straight line drawn from an edge of belt 2 to the tire center point. Point B represents a binding point of carcass 6 to rim 10 and is determined as an intersection of carcass 6 and a straight line running parallel to the tire axis and through the radially outermost contact point of bead area 4 with rim 10.

Between binding points A and B, the length of carcass 6 is selected to be between about 80% and 97%, and preferably between about 85 and 95%, of the calculated length of the corresponding carcass between those binding points according to the equilibrium figure (equilibrium formula).

Carcass 6 is also formed in the unpressurized, unloaded, and mounted condition of the tire in a cross-section having a relatively large radius such that, in any case, a mean radius of carcass 6 is greater than a mean radius of a carcass designed according to the equilibrium figure.

Figure 2:
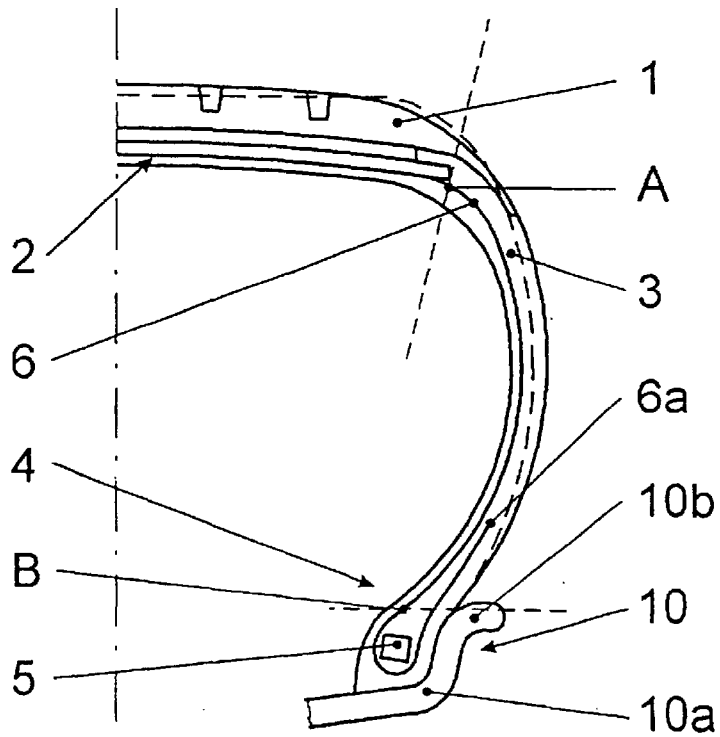
FIG. 2 schematically illustrates a cross-section of the vehicle pneumatic tire depicted in FIG. 1 mounted on a rim, unloaded, and under internal pressure, e.g., the rated pressure in accordance with E.T.R.T.O. standards.

By designing carcass 6 according to the present invention, when the tire is under internal pressure and in flattened condition under load, forces produced on the profile of carcass 6 by the internal pressure are transferred less strongly into the shoulder areas of the ground contact surface than would be the case if the carcass were formed in accordance with the equilibrium figure. As illustrated in FIG. 2, where the broken line represents the outer contour of the tire depicted in FIG. 1 (i.e., in the unpressurized condition), under internal pressure, the tire is deformed both in the tread area and in the area of the sidewalls toward the outside into a rounder contour, which is, therefore, also wider, with the length of the belt edges in comparison with the unpressurized condition, remaining at least substantially equal even though, particularly in this embodiment, a reduction in the distance between the edges of belt 2 and the tire axis occurs. In a zenith area, the tire grows in the radial direction. Therefore, the pressure distribution in the entire ground contact surface of the tire becomes more uniform than in the case of a carcass formed in accordance with the equilibrium figure or equilibrium formula.

When a tire is under internal pressure and load rolls, turn-ups 6a of carcass 6 are exposed to alternating tensile and compression stresses. It is known that these strains can lead to undesirable effects on different tire properties or also to premature bead damage.

To reduce these stresses in bead areas 4, the profile of carcass 6 is formed such that, in the unpressurized condition of the tire and when it is mounted on a rim, carcass 6 in a lower sidewall area is formed to be flatter, consequently having a larger radius, than where it is formed in an upper sidewall area. In this manner, an initial stress with tensile stresses acting toward the outside in turn-up 6a of carcass 6 can be deliberately produced by deforming it under internal pressure. In this way, turn-up 6a of carcass 6, when changing from the deflected to the non-deflected condition while the tire is rolling, is essentially subjected only to fluctuating tensile stresses.

Figure 3:
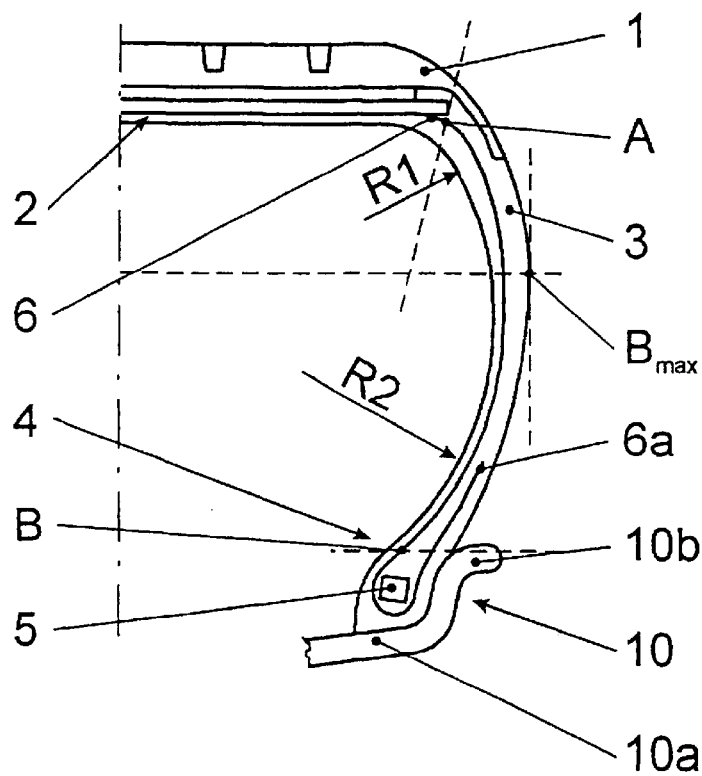
FIG. 3 schematically illustrates a cross-section of an alternative vehicle pneumatic tire in an unpressurized and unloaded condition.
Figure 4:
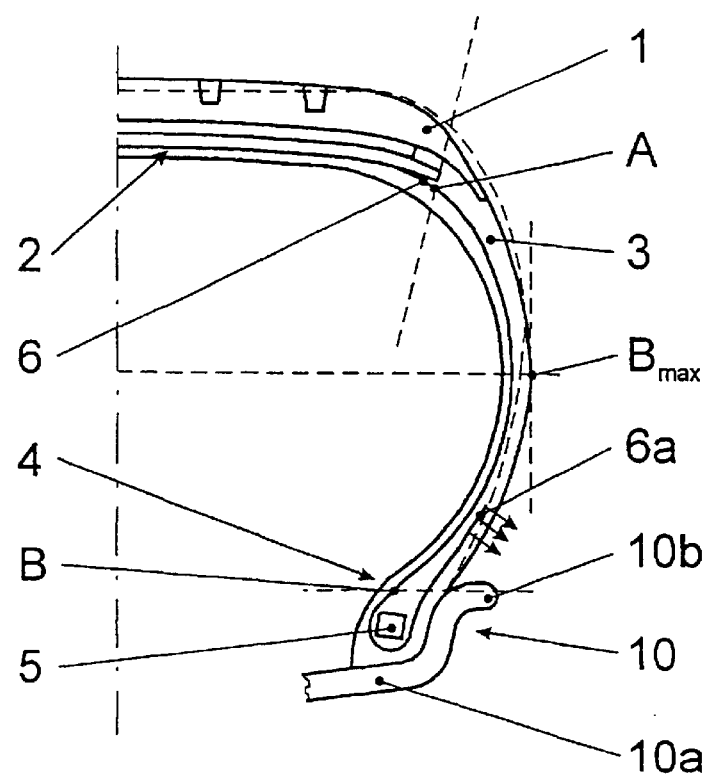
FIG. 4 schematically illustrates a cross-section of the alternative vehicle pneumatic tire depicted in FIG. 3 mounted on a rim, unloaded, and under internal pressure, e.g., the rated pressure in accordance with E.T.R.T.O. standards.

FIGS. 3 and 4 illustrates an alternative embodiment of the present invention, in which, in the unpressurized condition (as illustrated in FIG. 3), a point $B_{max}$, which is the point having the largest cross-sectional width, is located between binding points A and B. Carcass 6 in the region between points A and $B_{max}$ can be arranged to with a radius of curvature $R_1$, and in a region between points B and $B_{max}$, carcass 6 can be arranged with a radius of curvature $R_2$. Radius $R_1$ is present at least over a majority of the length of carcass 6 between points A and $B_{max}$ and radius $R_2$ is present at least over a majority of the length of carcass 6 between points $B_{max}$ and B. In this regard, $R_1<R_2$, e.g., the ratio of radii $R_1$ to $R_2$ is between about 1:1.1 and 1:2.2, and preferably between about 1:1.4 and 1:2.0.

According to an optimum design, in the unpressurized condition, the largest radius of curvature of carcass 6 is present at the bead in the area of point B, and the smallest radius of curvature is present in the area of point A at the edge of belt 2. Further, between points A and B, the radius of curvature of carcass 6 and, in the case of the usual arrangement, sidewall 3 continuously enlarges as well.

Figure 5:
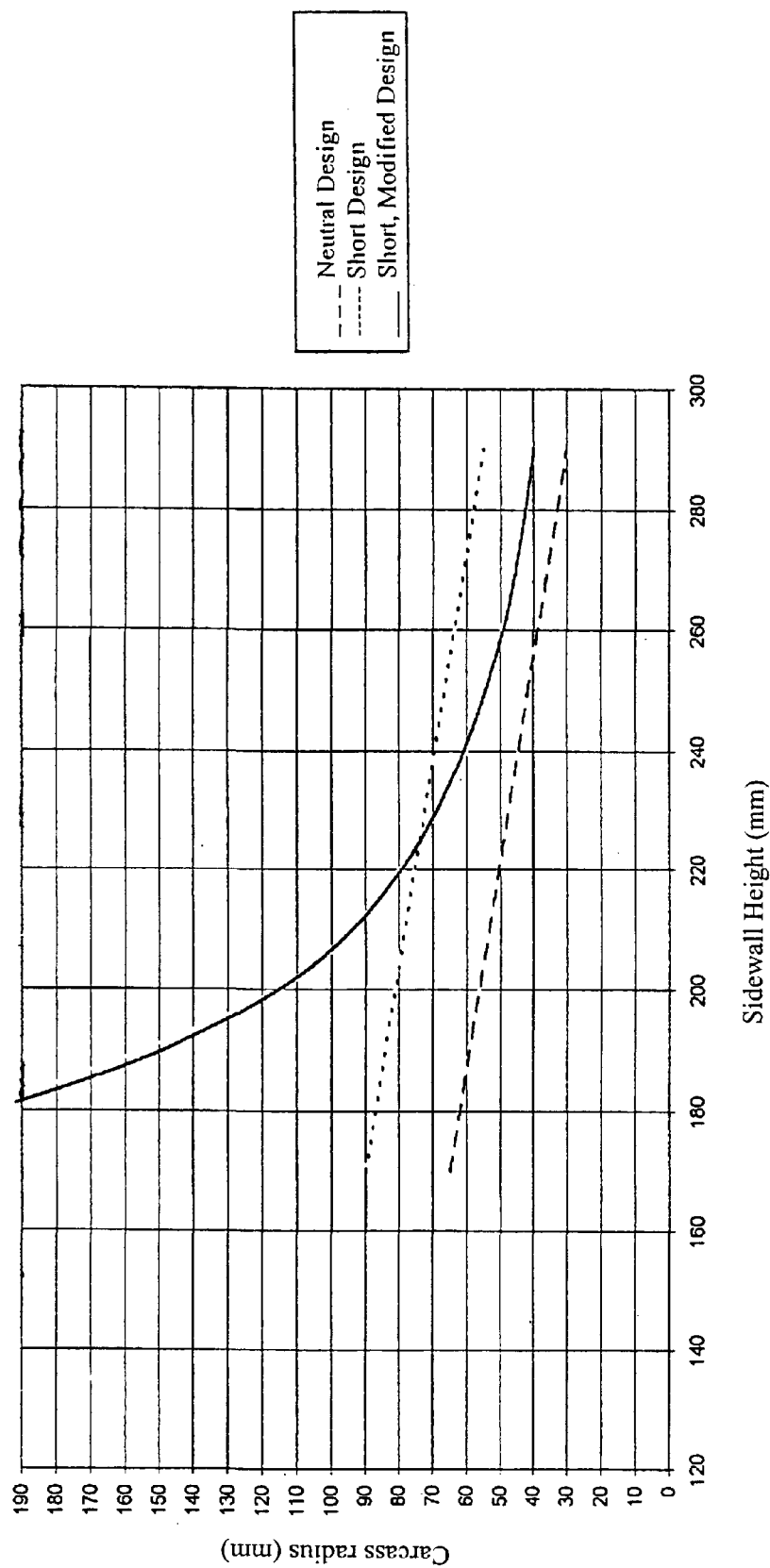
FIG. 5 diagrammatically illustrates the profile of carcass radius over sidewall height for tires in accordance with the prior art and in accordance with the instant invention.

FIG. 5 illustrates a progression of the radius over sidewall height, with the tire height being shown in millimeters along the x-axis and the radius of carcass 6 also being shown in millimeters along the y-axis. The dotted line, which is essentially straight, depicts the situation for a tire designed according to the prior art, where the profile of the carcass is positioned according to the neutral, i.e., according to the equilibrium formula. The solid line shows the progression for a short carcass as described above. The broken line shows the conditions for a carcass that is both designed short and in which the radius of curvature continuously enlarges starting from point A up to point B.

Under internal pressure (as depicted in FIG. 4) an equilibrium contour occurs once again, which has the consequence that the tire sidewalls deform such that the point having the largest cross-sectional width $B_{max}$ (in the unpressurized condition) shifts in a direction toward the bead, and the radius or radii of curvature in the area between $B_{max}$ and point A increase(s), while the radius or radii of curvature between $B_{max}$ and point B decrease(s). In this way, a nearly constant radius of curvatures results over the profile of carcass 6 between A and B, which produces the desired fluctuating tensile stresses in carcass turn-up 6a acting from the tire toward the outside, as indicated by the arrow in FIG. 4.

In the design of the contour of carcass 6 according to the present invention, it is beneficial if no further measures to influence the curvature of the tread are taken through the tire form, in order to avoid undesired effects on specific tire properties, e.g., abrasion and rolling resistance. Within the framework of the present invention, it is advantageous when the tread curvature is selected to be comparatively flat and a corresponding curvature having one or two radii is used.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects.

Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A vehicle pneumatic tire comprising:

a patterned tread;

a belt brace comprising at least one layer;

bead areas having bead cores;

a carcass having at least one layer, which is arranged through said sidewalls, around the bead cores, and back into the sidewalls as turn-ups;

said carcass and said belt brace being coupled together at a belt binding point, and a radially outmost portion of said bead area adapted to contact a standard rim forming a bead binding point between said carcass and said bead area;

said carcass, in a region between said belt binding point and said bead binding point, being formed with a length shorter than that of a theoretical carcass between said belt binding point and said bead binding points determined in accordance with an equilibrium figure; and said length of said carcass and said theoretical length of said carcass being determined for the tire in an unpressurized condition and when the tire is mounted on the standard rim, wherein said length of said carcass between said binding points is about 80 to 97% of the length of the theoretical carcass between said binding points.

2. The vehicle tire in accordance with claim 1, wherein said length of said carcass between said binding points is about 85 to 95% of the length of the theoretical carcass between said binding points.

3. A vehicle pneumatic tire comprising:

a patterned tread;

a belt brace comprising at least one layer;

bead areas having bead cores;

a carcass having at least one layer, which is arranged through said sidewalls, around the bead cores, and back into the sidewalls as turn-ups;

said carcass and said belt brace being coupled together at a belt binding point, and a radially outmost portion of said bead area adapted to contact a standard rim forming a bead binding point between said carcass and said bead area;

said carcass, in a region between said belt binding point and said bead binding point, being formed with a length shorter than that of a theoretical carcass between said belt binding point and said bead binding points determined in accordance with an equilibrium figure; and said length of said carcass and said theoretical length of said carcass being determined for the tire in an unpressurized condition and when the tire is mounted on the standard rim, wherein, in an unpressurized, unloaded condition of the tire while it is mounted on the standard rim, said carcass, in an area between said belt binding point and a largest cross-sectional width point of said tire, has a radius of curvature which is smaller than a radius of curvature of said carcass between said largest cross-sectional width point and said bead binding point, and wherein, in the unpressurized, unloaded, and mounted condition of the tire, a ratio of the radii of curvature, from smallest radius to largest radius, is between about 1:1.1 and 1:2.2.

4. The vehicle tire in accordance with claim 3, wherein the ratio of the radii of curvature is between about 1:1.4 and 1:2.0.

5. A vehicle pneumatic tire comprising:
a patterned tread;
a belt brace comprising at least one layer;
bead areas having bead cores;
a carcass having at least one layer, which is arranged through said sidewalls, around the bead cores, and back into the sidewalls as turn-ups;
said carcass and said belt brace being coupled together at a belt binding point, and a radially outmost portion of said bead area adapted to contact a standard rim forming a bead binding point between said carcass and said bead area;
said carcass, in a region between said belt binding point and said bead binding point, being formed with a length shorter than that of a theoretical carcass between said belt binding point and said bead binding points determined in accordance with an equilibrium figure; and
said length of said carcass and said theoretical length of said carcass being determined for the tire in an unpressurized condition and when the tire is mounted on the standard rim,
wherein, in an unpressurized, unloaded condition of the tire while it is mounted on the standard rim, said carcass, in an area between said belt binding point and a largest cross-sectional width point of said tire, has a radius of curvature which is smaller than a radius of curvature of said carcass between said largest cross-sectional width point and said bead binding point, and
wherein, in the unpressurized, unloaded, and mounted condition of the tire, the radius of curvature of said carcass is smallest in a region of said belt binding point and largest in a region of said bead binding point, and wherein the radius of curvature between the belt binding point region and bead binding point region continuously increases.

6. A process for forming a vehicle pneumatic tire that includes a patterned tread, a belt brace comprising at least one layer, bead areas having bead cores, and a carcass, having at least one layer, the process comprising:
arranging the carcass through the sidewalls, around the bead cores, and back into the sidewalls as turn-ups, wherein a portion of the carcass extends at least from a belt binding point, at which the carcass is coupled to the belt, to a bead binding point, which is a radially outmost portion of the bead area that is adapted to contact a standard rim; and
forming the portion of the carcass with a length which is shorter than that of a theoretical carcass between the belt binding point and the bead binding point determined in accordance with an equilibrium figure, the length of the carcass and the theoretical length of the carcass being determined for the tire in an unpressurized condition and when the tire is mounted on the standard rim,
wherein the length of the carcass between the binding points is about 80 to 97% of the length of the theoretical carcass between the binding points.

7. The process in accordance with claim 6, wherein length of the carcass between the binding points is about 85 to 95% of the length of the theoretical carcass between the binding points.

8. A process for forming a vehicle pneumatic tire that includes a patterned tread, a belt brace comprising at least one layer, bead areas having bead cores, and a carcass, having at least one layer, the process comprising:
arranging the carcass through the sidewalls, around the bead cores, and back into the sidewalls as turn-ups, wherein a portion of the carcass extends at least from a belt binding point, at which the carcass is coupled to the belt, to a bead binding point, which is a radially outmost portion of the bead area that is adapted to contact a standard rim; and
forming the portion of the carcass with a length which is shorter than that of a theoretical carcass between the belt binding point and the bead binding point determined in accordance with an equilibrium figure, the length of the carcass and the theoretical length of the carcass being determined for the tire in an unpressurized condition and when the tire is mounted on the standard rim,
wherein, in an unpressurized, unloaded condition of the tire while it is mounted on the standard rim, the process further comprises:
forming the carcass, in an area between the belt binding point and a largest cross-sectional width point of said tire, with a radius of curvature which is smaller than a radius of curvature of said carcass between the largest cross-sectional width point and the bead binding point, and
wherein, in the unpressurized, unloaded, and mounted condition of the tire, a ratio of the radii of curvature, from smallest radius to largest radius, is between about 1:1.1 and 1:2.2.

9. The process in accordance with claim 8, wherein the ratio of the radii of curvature is between about 1:1.4 and 1:2.0.

10. A process for forming a vehicle pneumatic tire that includes a patterned tread, a belt brace comprising at least one layer, bead areas having bead cores, and a carcass, having at least one layer, the process comprising:
arranging the carcass through the sidewalls, around the bead cores, and back into the sidewalls as turn-ups, wherein a portion of the carcass extends at least from a belt binding point, at which the carcass is coupled to the belt, to a bead binding point, which is a radially outmost portion of the bead area that is adapted to contact a standard rim; and
forming the portion of the carcass with a length which is shorter than that of a theoretical carcass between the belt binding point and the bead binding point determined in accordance with an equilibrium figure, the length of the carcass and the theoretical length of the carcass being determined for the tire in an unpressurized condition and when the tire is mounted on the standard rim,
wherein, in an unpressurized, unloaded condition of the tire while it is mounted on the standard rim, the process further comprises:
forming the carcass, in an area between the belt binding point and a largest cross-sectional width point of said tire, with a radius of curvature which is smaller than a radius of curvature of said carcass between the largest cross-sectional width point and the bead binding point, and
wherein, in the unpressurized, unloaded, and mounted condition of the tire, the process further comprising:

forming the carcass such that its radius of curvature is smallest in a region of the belt binding point and is largest in a region of the bead binding point, wherein the radius of curvature between the belt binding point region and bead binding point region continuously increases.

* * * * *